United States Patent
Chandorkar

[11] Patent Number: 6,166,928
[45] Date of Patent: Dec. 26, 2000

[54] METHOD FOR OPEN-LOOP AND CLOSED-LOOP CONTROL OF AN ELECTRICAL DRIVE AS WELL AS AN APPARATUS FOR CARRYING OUT THE METHOD

[75] Inventor: Mukul Chandorkar, Baden, Switzerland

[73] Assignee: DaimlerChrysler AG, Stuttgart, Germany

[21] Appl. No.: 09/399,762

[22] Filed: Sep. 21, 1999

[30] Foreign Application Priority Data

Sep. 25, 1998 [DE] Germany ............................ 198 44 050

[51] Int. Cl.[7] .............................. H02M 5/40; H02M 1/12; H02M 7/44

[52] U.S. Cl. .................................. 363/34; 363/34; 363/41; 363/98

[58] Field of Search .................................. 363/34, 37, 41, 363/98, 95, 97, 132

[56] References Cited

U.S. PATENT DOCUMENTS

| | | | |
|---|---|---|---|
| 4,074,359 | 2/1978 | Hasenbalg ................................ | 364/521 |
| 4,584,505 | 4/1986 | Chung et al. ............................ | 318/254 |
| 5,140,248 | 8/1992 | Rowan et al. ........................... | 318/811 |
| 5,225,712 | 7/1993 | Erdman .................................... | 290/44 |
| 5,294,876 | 3/1994 | Jonsson .................................... | 318/803 |
| 5,444,350 | 8/1995 | Werle et al. ............................. | 318/727 |
| 5,498,946 | 3/1996 | Plumer et al. ........................... | 318/809 |
| 5,530,323 | 6/1996 | Breitzmann .............................. | 318/85 |
| 5,585,708 | 12/1996 | Richardson ............................... | 318/800 |
| 5,635,811 | 6/1997 | Rebban et al. .......................... | 318/778 |

FOREIGN PATENT DOCUMENTS

| | | | |
|---|---|---|---|
| 35 23 665A1 | 1/1987 | Germany | .......................... H02P 7/44 |
| 40 36 842A1 | 5/1991 | Germany | ........................ H02P 5/408 |
| 19532142A1 | 3/1997 | Germany | ........................ H02P 21/00 |

OTHER PUBLICATIONS

Von S.N. Kalaschnikow, "Regelung des netzseitigen Pulsstromrichters eines Vier–Quadranten–Spannungszwischenkreis–Umrichters", 1994, pp. 102–111.

Translation of the explanations ("Erklärungen") of enclosure 2 ("Anlage 2") of the search report of the German Patent Office ("Deutsches Patentamt") explaining the symbol letters stating the relevance of the cited references.

German Search Report.

*Primary Examiner*—Peter S. Wong
*Assistant Examiner*—Bao Q. Vu
*Attorney, Agent, or Firm*—Burns, Doane, Swecker & Mathis, L.L.P.

[57] ABSTRACT

In a method for open-loop and closed-loop control of an electrical drive, which comprises an asynchronous motor (18) which is supplied by a DC-AC invertor (14) with a downstream sine-wave output filter (15) with an AC voltage at a predetermined circular frequency ($\omega$), stable operation with a good control response and reliable damping of natural filter oscillations is achieved in that the voltage at the output of the sine-wave output filter (15) is measured, in that the measured filter voltage is assigned a complex filter voltage vector (E) in a complex reference system rotating at the circular frequency ($\omega$), and in that the DC-AC invertor (14) is actuated in such a manner that the complex filter voltage vector (E) corresponds to a predetermined required voltage vector (E*).

4 Claims, 1 Drawing Sheet

METHOD FOR OPEN-LOOP AND CLOSED-LOOP CONTROL OF AN ELECTRICAL DRIVE AS WELL AS AN APPARATUS FOR CARRYING OUT THE METHOD

BACKGROUND OF THE INVENTION

1. Field of the Invention

The present invention relates to the field of electrical drives. Specifically, it relates to a method for open-loop and closed-loop control of an electrical drive which comprises an asynchronous motor which is supplied by a DC-AC invertor with a downstream sine-wave output filter with an AC voltage at a predetermined circular frequency.

2. Discussion of Background

Drives having asynchronous motors in which the AC voltage that is required for the drive and is at a selectable frequency is produced by a DC-AC invertor from a DC voltage intermediate circuit or some other DC voltage source by appropriate actuation of power semiconductors which are arranged in a bridge circuit, are frequently equipped at the output of the invertor with LC filters which act as sine-wave output filters and convert the steep-edged voltage pulses from the invertor into a sinusoidal voltage with a variable frequency and amplitude for the motor.

The motor insulation and the bearings of the asynchronous motor, which are frequently subject to problems resulting from the steep edges when pulsed invertors are used are far less at risk owing to the filtered sinusoidal voltage. Furthermore, a sinusoidal motor voltage reduces the iron losses, the audible noise in the machine, and the electromagnetic interference fields.

If a drive is equipped with a sine-wave output filter, natural oscillations of the filter also have to be taken into account. The invertor itself must be operated such that these oscillations are damped, since it is normally impractical to rely on the natural damping of the filter. Furthermore, the interactions between the asynchronous motor and the filter also have to be considered. Since the asynchronous motor is a non-linear load, these interactions are extremely complex. Any closed-loop control system used for the drive should take account of these problems.

In order that the combination of the invertor, filter and asynchronous machine operates in a stable manner and at the same time has a rapid dynamic response, a standard solution shall be found for the operation of the combination. At the same time, it is desirable to minimize the complexity in terms of measurement devices and measurements required for the closed-loop control system.

Known closed-loop control methods generally use one of the following two solutions:

At least two sensors are used to measure the current in the filter capacitors of the output filter. However, this leads to additional costs and necessitates additional space in the arrangement.

A high-pass filter is used in the closed-loop control system for the output voltage. This has the disadvantage that the regulator response is very highly dependent on the output frequency, and that there is a frequency-dependent difference, which is stable with respect to time, between the required value and the actual value of the output voltage, which difference has a disadvantageous effect for high-power asynchronous drives. Furthermore, the high-pass filter—in the same way as a differential regulator—is sensitive to measurement noise.

SUMMARY OF THE INVENTION

Accordingly, one object of the invention is to provide a novel method for open-loop and closed-loop control of a drive having a DC-AC invertor, sine-wave output filter and asynchronous machine, which has a low level of associated measurement complexity, ensures reliable damping of the output filter, is insensitive to noise and allows stable operation of the drive over the entire speed and torque range, and to specify an apparatus for carrying out the method.

The object is achieved by the totality of features in claim 1. The essence of the invention is to measure the voltages at the output of the sine-wave output filter, and to use them as a control variable. The closed-loop control is in this case carried out in a reference system which rotates at the frequency of the AC output voltage produced by the invertor.

A first preferred embodiment of the method according to the invention is distinguished in that the individual phase voltages $e_u$, $e_v$ and $e_w$, at the output of the sine-wave filter are measured in order to form the complex filter voltage vector, in that the measured phase voltages are transformed in accordance with the transformation $$\begin{pmatrix} e_q \\ e_d \end{pmatrix} = \begin{pmatrix} \cos\theta & -\sin\theta \\ \sin\theta & \cos\theta \end{pmatrix} \begin{pmatrix} e_u \\ \frac{1}{\sqrt{3}}(e_w - e_v) \end{pmatrix}$$

into the component $e_q$, $e_d$ of a space vector, where $$\theta = \theta(t) = \theta(0) + \int_0^t \omega(\tau) d\tau$$

is the transformation angle, and in that the complex filter vector is formed from the components $e_q$, $e_d$ of the space vector in accordance with the equation $E=e_q-je_d$, where $j=\sqrt{-1}$. These transformations have the advantage that they can be carried out very easily by means of a digital signal processor (DSP) which is known per se. At the same time, it is advantageous that the regulator need be designed only for DC voltage levels.

A further preferred embodiment of the method according to the invention is distinguished in that a complex required flux voltage vector is produced by means of a proportional control system (which operates in the complex, rotating reference system) and an integrating regulator path from the difference between the required voltage vector and the complex filter voltage vector for the DC-AC invertor, and in that the DC-AC invertor is actuated in a pulse-duration-modulated manner in accordance with this required flux vector. Flux control can be implemented particularly easily in conjunction with the regulator, which is in the form of a PI regulator.

The apparatus according to the invention for carrying out the method is distinguished in that the apparatus comprises a regulator which is connected on the input side to means (which are arranged at the output of the sine-wave output filter), for measuring the phase voltages of the sine-wave output filter, in that the regulator (19) is connected on the output side via a pulse-width modulator to the DC-AC invertor, in that the regulator comprises, on the input side, first transformation means for producing the complex filter voltage vector from the input signals, as well as means for comparing the complex filter voltage vector which is produced with a predetermined required voltage vector and in that the regulator is designed as a complex PI regulator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
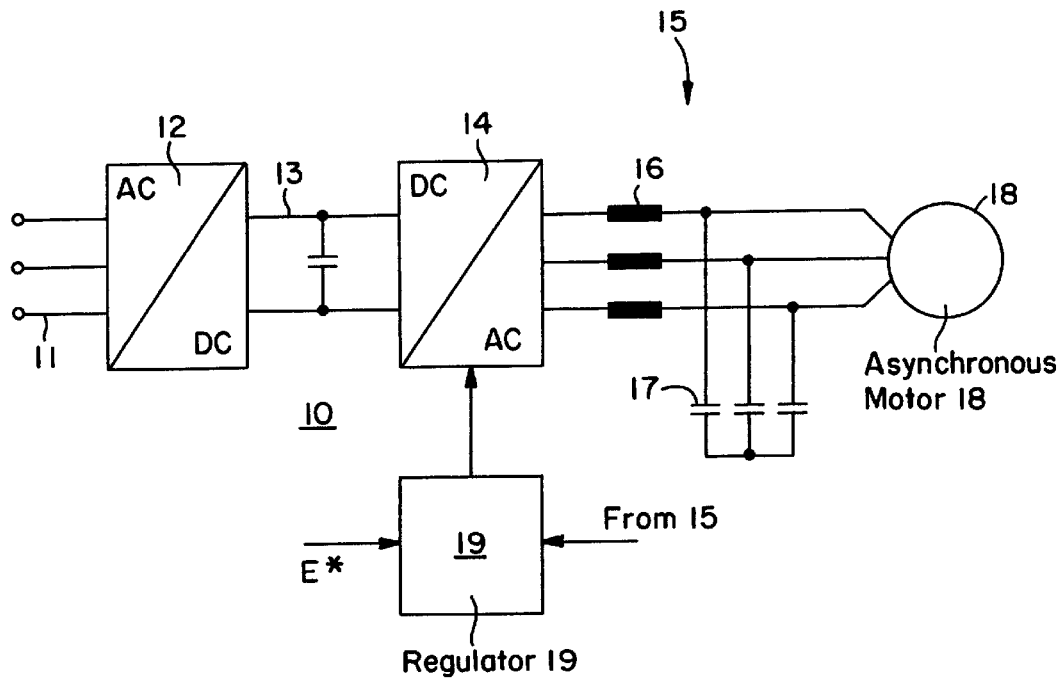
FIG. 1 shows the block diagram of a drive which is suitable for implementation of the invention.

Referring now to the drawings, wherein like reference numerals designate identical or corresponding parts throughout the several views, FIG. 1 shows, schematically, an electrical drive which is used as the basis of the closed-loop control system described in the following text. The electrical drive 10 comprises a DC-AC invertor 14 which, on the output side, supplies an asynchronous motor 18, via a sine-wave output filter 15, with a (three-phase) AC voltage at a variable frequency. On the input side, the DC-AC invertor 14 is connected in a manner known per se to a DC voltage intermediate circuit 13 which, for its part, is connected to the output of an AC-DC rectifier 12, which has an AC voltage input 11 which can be connected to an AC voltage supply.

The sine-wave output filter 15 is designed as an LC filter and comprises three filter inductances 16 which are connected in series with the phases, and three filter capacitors 17 which are connected from the phases to a common junction point. A regulator 19 is provided for closed-loop control of the drive 10, compares a measured actual value of the drive with a predetermined required value and acts on the control system for the DC-AC invertor 14 on the basis of the comparison result.

Figure 2:
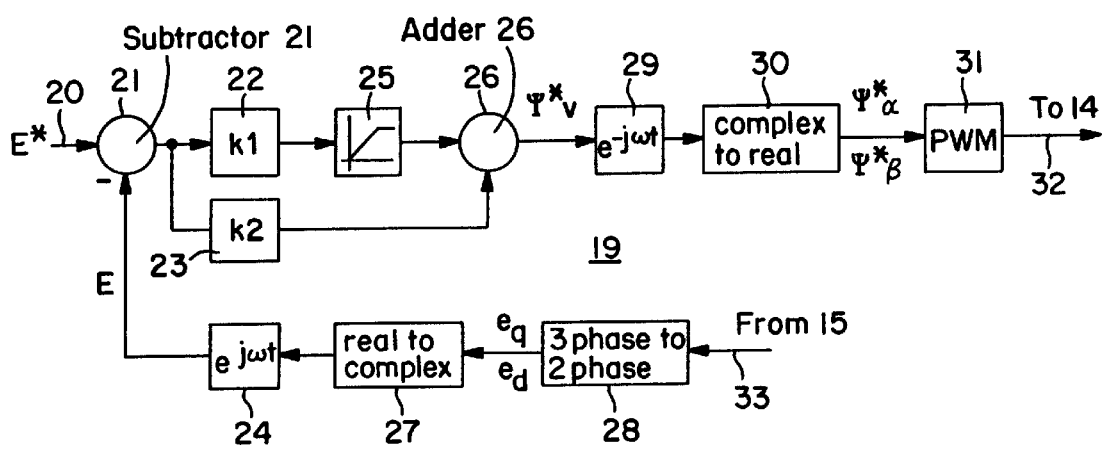
FIG. 2 shows a schematic block diagram of a preferred exemplary embodiment for closed-loop control and a regulator according to the invention.

The simplified (schematic) illustration of a regulator 19 as function blocks according to a preferred exemplary embodiment of the invention is shown in FIG. 2. The controlled variable is a complex filter voltage vector E, which is compared in the subtractor 21 with a predetermined required voltage vector E*. The filter voltage vector E is formed as follows: the individual phase voltages $e_u$, $e_v$ and $e_w$ are measured at the output of the sine-wave output filter 15. The measured phase voltages are input via a filter voltage input 33 and are transformed in a transformation block 28 in accordance with the transformation $$\begin{pmatrix} e_q \\ e_d \end{pmatrix} = \begin{pmatrix} \cos\theta & -\sin\theta \\ \sin\theta & \cos\theta \end{pmatrix} \begin{pmatrix} e_u \\ \frac{1}{\sqrt{3}}(e_w - e_v) \end{pmatrix}$$

into the components $e_q$, $e_d$ of a space vector, where $$\theta = \theta(t) = \theta(0) + \int_0^t \omega(\tau) d\tau$$

($\omega$=expected circular frequency of the AC voltage at the output of the sine-wave output filter 15) is the transformation angle. The filter voltage vector E is then formed from the components $e_q$, $e_d$ of the space vector in a first converter 27 in accordance with the equation $E = e_q - je_d$, where $j=\sqrt{-1}$, and is then transferred into a reference system rotating at the circular frequency $\omega$, by multiplication by the factor $e^{j\omega t}$ in a first multiplier 24.

The difference which is formed in the subtractor 21 between the filter voltage vector E and the required voltage vector E* which is present at the required voltage input 20 is passed on the one hand to an integrating regulator path having a first amplifier 22 and an integrator 25, and on the other hand to a proportional regulator path having a second amplifier 23. The two amplifiers 22, 23 respectively have complex gain factors $k1=k_{11}+jk_{12}$ and $k2=k_{21}+jk_{22}$. The output variables of the two filter paths are added in an adder 26 and then form a complex required flux vector $\Psi^*_v$, which is transformed back from the rotating reference system by multiplication by the factor $e_{-j\omega t}$ in a second multiplier 29, and is then reduced to the real components $\Psi_\alpha^*$ and $\Psi_\beta^*$ again in a second converter 30. These components are then used to actuate a pulse-width modulator 31 which, for its part, emits via a control signal output 32 appropriate control signals for actuating the power switches in the DC-AC invertor 14.

The DC-AC invertor 14 and the downstream sine-wave output filter 15 can be described in the complex, rotating reference system by the following equation system:

$$\begin{pmatrix} \dot{E} \\ \dot{\Psi}_e \end{pmatrix} = \begin{pmatrix} -j\omega & -\frac{1}{LC} \\ 1 & -j\omega \end{pmatrix} \begin{pmatrix} E \\ \Psi_e \end{pmatrix} + \begin{pmatrix} \frac{1}{LC} & \frac{-1}{C} \\ 0 & 0 \end{pmatrix} \begin{pmatrix} \Psi_v \\ I_L \end{pmatrix},$$

with the filter voltage vector E and its time derivative, the load-current vector $I_L$, the space vector $\Psi_e$ of the sine-wave output filter 15, the space vector $\Psi_v$ of the invertor flux and the values L and C of the filter inductance 16 and of the filter capacitor 17, respectively. The space vector $\Psi_e$ of the sine-wave output filter 15 is in this case defined in a stationary reference system by $$\Psi_e(t) = \Psi_e(t_0) + \int_0^t E \, d\tau,$$

and the space vector $\Psi_v$ of the inventor flux is defined by $$\Psi_v(t) = \Psi_v(t_0) + \int_0^t V \, d\tau,$$

where V is the complex vector, analogous to E of the invertor output voltage.

The aim of the closed-loop control is now to change the space vector $\Psi_v$ of the invertor flux such that the filter voltage vector E becomes equal to the required voltage vector E*. The regulator blocks 21, 22, 23, and 25 are in this case included in the closed-loop control in accordance with the following equation system:

$$\begin{pmatrix} \dot{E} \\ \dot{\Psi}_e \\ \dot{\Psi}_v \end{pmatrix} = \begin{pmatrix} -j\omega & -\omega_f^2 & \omega_f^2 \\ 1 & -j\omega & 0 \\ j\omega k2 - k1 & k2\omega_f^2 & -k2\omega_f^2 \end{pmatrix} \begin{pmatrix} E \\ \Psi_e \\ \Psi_v \end{pmatrix} + \begin{pmatrix} 0 & 0 & -\frac{1}{C} \\ 0 & 0 & 0 \\ k1 & k2 & \frac{k2}{C} \end{pmatrix} \begin{pmatrix} E^* \\ \dot{E}^* \\ I_L \end{pmatrix},$$

Where $\Psi_f$ Of is the resonance frequency of the LC combination of the sine-wave output filter 15, k1 and k2 of the two complex gain factors, and E* is the required voltage vector (the variables with a dot above them each represent the first time derivative).

The closed-loop control is intended to ensure that, in the rotating, complex reference system, the filter voltage vector E is constant and is equal to the constant, predetermined required voltage vector E*. Once this is achieved, this implies that the phase voltages in the filter are at the desired frequency and amplitude. At the same time, this closed-loop control automatically ensures that the natural oscillations of the sine-wave output filter 15 are effectively damped since, at all times, the closed-loop control ensures that the vectors E and E* are parallel. In contrast to the previously known and used closed-loop control methods, in which the currents in the filter capacitors 17 are measured, no knowledge of the capacitor currents is required for the present method, thus saving current sensors and hence reducing the costs and space required.

The regulator 19 produces the desired required flux vector $\Psi^*_v$ for the DC-AC invertor 15. This is the value which—as stated further above—the time integral of the complex invertor output voltage V is intended to have. The invertor 14 is then actuated with pulse-width modulation such that this value is reached or is approached. In one specific case, the required voltage vector E* can be specified as a real variable (imaginary part=0). The regulator will then align the filter voltage with the quadrature axis (q-axis) of the rotating reference system, and will control the magnitude of the filter voltage to the value E=|E*|. The output frequency is varied by varying the transformation rate $\omega$. The regulator then sets the various electrical variables such that the predetermined values are satisfied in the new rotating reference system.

The complex gain factors k1 and k2 are chosen in accordance with the known approximate values of the parameters of the asynchronous motor 18 and the values of the filter inductances 16 and the filter capacitors 17 such that the regulator 19 has a stable control behavior, and a rapid control response. The resultant closed-loop control method can in this way damp the natural resonance of the sine-wave output filter 15 and the interactions between the filter and the asynchronous motor 18. Furthermore, it ensures stable operation of the motor. Finally, the regulator structure can be implemented in a particularly simple manner by using a digital signal processor (DSP).

There are applications for the closed-loop control method according to the invention in, for example, motor drives in which sine-wave output filters are used in order to protect the motor insulation and the bearings. This is typically the case when electronic drive converters are combined with relatively old types of motors. Furthermore, sinusoidal output voltages are often required for 400 Hz aircraft power supply systems for airports. Other future applications of power converters with a sinusoidal output voltage, and thus of the proposed closed-loop control method, may be modules for power-electronic components.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for open-loop and closed-loop control of an electrical drive, which comprises an asynchronous motor which is supplied by a DC-AC invertor with a downstream sine-wave output filter with an AC voltage at a predetermined circular frequency ($\omega$), wherein the voltage at the output of the sine-wave output filter is measured, wherein the measured filter voltage is assigned to a complex filter voltage vector (E) in a complex reference system rotating at the circular frequency ($\omega$), wherein the DC-AC invertor is actuated in such a manner that the complex filter voltage vector (E) corresponds to a predetermined required voltage vector (E*), and wherein a complex required flux vector ($\Psi^*_v$) is produced by means of a proportional control system, which operates in the complex, rotating reference system, and an integrating regulator path from a difference between the required voltage vector (E*) and the complex filter voltage vector (E) for the DC-AC invertor, wherein the DC-AC invertor is actuated in a pulse-duration-modulated manner in accordance with the required flux vector ($\Psi^*_v$).

2. The method as claimed in claim 1, wherein the individual phase voltages $e_u$, $e_v$ and $e_w$ at the output of the sine-wave output filter are measured in order to form the complex filter voltage vector (E), wherein the measured phase voltages are transformed in accordance with the transformation $$\begin{pmatrix} e_q \\ e_d \end{pmatrix} = \begin{pmatrix} \cos\theta & -\sin\theta \\ \sin\theta & \cos\theta \end{pmatrix} \begin{pmatrix} e_u \\ \frac{1}{\sqrt{3}}(e_w - e_v) \end{pmatrix}$$

into the component $e_q$, $e_d$ of a space vector, where $$\theta = \theta(t) = \theta(0) + \int_0^t \omega(\tau)d\tau$$

is the transformation angle, and wherein the complex filter vector (E) is formed from the components $e_q$, $e_d$ of the space vector in accordance with the equation $E=e_q-je_d$, where $j=\sqrt{-1}$.

3. The method as claimed in one claim 1, wherein a digital signal processor (DSP) is used to convert the various measured variables and controlled variables.

4. An apparatus for carrying out the method as claimed in claim 1, wherein the apparatus comprises a regulator which is connected on the input side to means arranged at the output of the sine-wave output filter for measuring the phase voltages of the sine-wave output filter, wherein the regulator is connected on the output side via a pulse-width modulator to the DC-AC invertor, wherein the regulator comprises, on the input side, first transformation means for producing the complex filter voltage vector (E) from the input signals, as well as means for comparing the complex filter voltage vector (E) which is produced with a predetermined required voltage vector (E*) and wherein the regulator is designed as a complex PI regulator, and wherein the regulator further comprises a proportional control system and an integrating regulator path for producing a complex required flux vector ($\Psi^*_v$) based on the comparison of the complex filter voltage vector (E) with the predetermined required voltage vector (E*), and wherein the regulator actuates the DC-AC invertor via the pulse-width modulator in accordance with the complex required flux vector ($\Psi^*_v$).

* * * * *